United States Patent [19]

Dardenne-Ankringa, Jr.

[11] 3,963,611

[45] June 15, 1976

[54] OXIDATION PROCESS FOR IMPROVING THE ENVIRONMENTAL QUALITY OF WATER CONTAINING SULFUR AND/OR INORGANIC SUB-SIX-SULFUR-CONTAINING IMPURITIES

[75] Inventor: Walter Dardenne-Ankringa, Jr., El Sobrante, Calif.

[73] Assignee: Chevron Research Company, San Francisco, Calif.

[22] Filed: Mar. 4, 1975

[21] Appl. No.: 555,332

Related U.S. Application Data

[63] Continuation of Ser. No. 410,147, Oct. 26, 1973, abandoned, which is a continuation-in-part of Ser. No. 306,116, Nov. 10, 1972, abandoned.

[52] U.S. Cl. .............................. 210/63 R; 423/544
[51] Int. Cl.² ............................................ C02C 5/04
[58] Field of Search .......................... 210/63, 59, 50; 423/512, 514, 544, 571, 574

[56] References Cited
UNITED STATES PATENTS 3,186,942   6/1965   Benger ................................. 210/63
3,761,409   9/1973   McCoy et al. ....................... 210/63

OTHER PUBLICATIONS

Martin et al.; "New Column Removes Sulphide With Air," Hydrocarbon Processing & Petroleum Refinery, May, 1962, vol. 41, No. 5, pp. 149–153.
Gurnham, F. C.; "Industrial Wastewater Control," Academic Press N.Y. 1965, p. 296.

Primary Examiner—Charles N. Hart
Assistant Examiner—Benoit Castel
Attorney, Agent, or Firm—G. F. Magdeburger; R. H. Davies; D. L. Hagmann

[57] ABSTRACT

A method is disclosed wherein a water stream is improved by oxidizing sulfur and/or the sulfur content of sub-six-sulfur-containing impurities in the stream to sulfate. In the method, the stream is contacted with molecular oxygen under particular conditions which include an elevated temperature, a substantial oxygen gas partial pressure, a pH of at least 9.6 and the substantial absence of a heavy metal oxidation catalyst. For each gram atom of sub-six sulfur, the contact mixture must contain at least one equivalent of a strong inorganic base such as sodium hydroxide.

10 Claims, 1 Drawing Figure

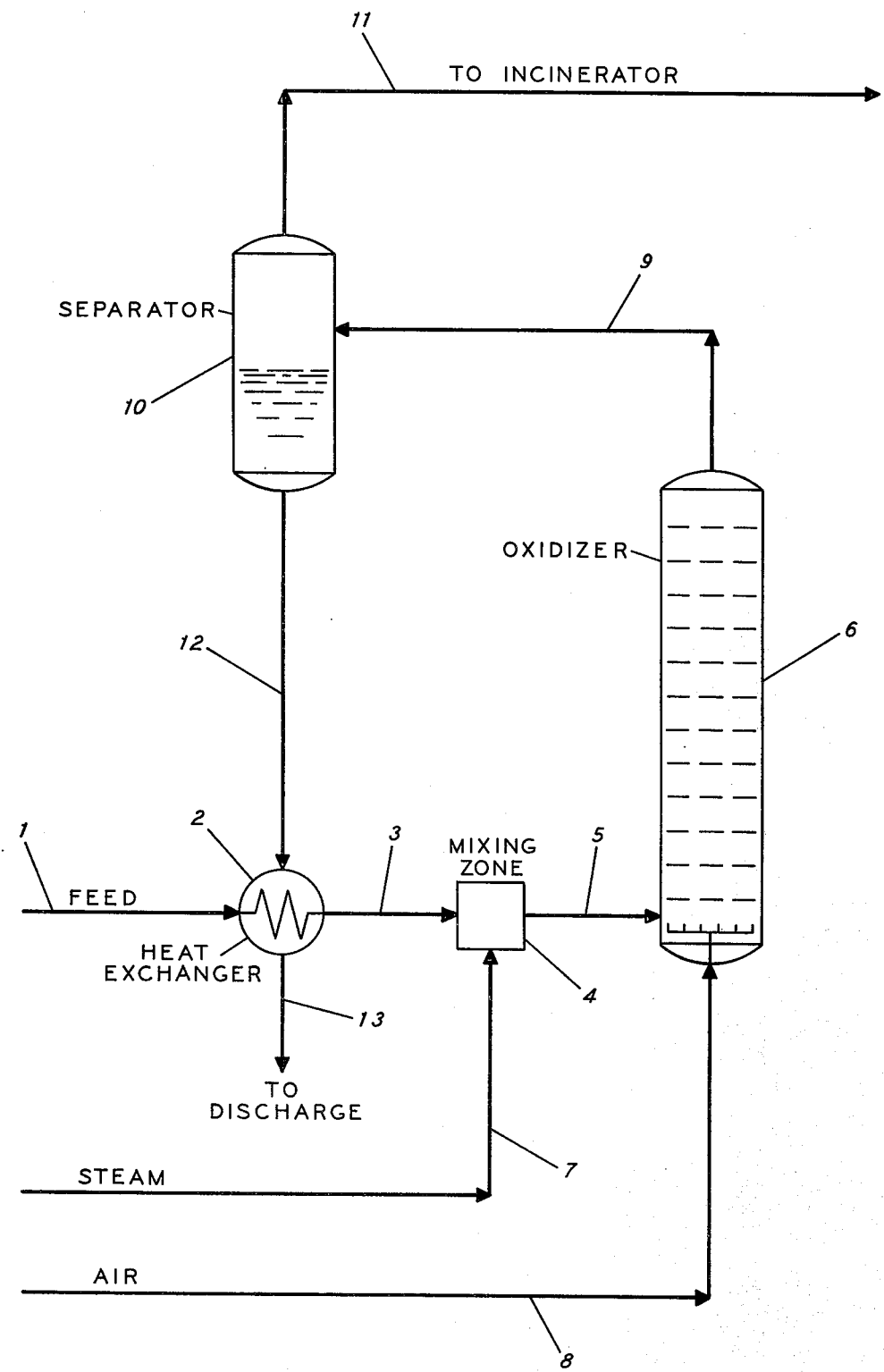

OXIDATION PROCESS FOR IMPROVING THE ENVIRONMENTAL QUALITY OF WATER CONTAINING SULFUR AND/OR INORGANIC SUB-SIX-SULFUR-CONTAINING IMPURITIES

CROSS REFERENCE TO RELATED APPLICATION

This is a continuation of application Ser. No. 410,147, filed Oct. 26, 1973 (now abandoned), which is a continuation-in-part of application Ser. No. 306,116, filed Nov. 10, 1972 (now abandoned).

BACKGROUND OF THE INVENTION

1. Field of the Invention

This invention relates to a method for improving the environmental quality of water which contains undesirable inorganic sub-six-sulfur-containing impurities. More particularly, it relates to a method for improving a water stream by converting the sub-six sulfur of a sulfur-containing impurity present in the stream to sulfate. By "sub-six sulfur" as used herein is meant sulfur having a valence (oxidation state) below plus 6.

There is a pressing need for a method in which sulfur and/or the sulfur content of an inorganic sub-six-sulfur-containing impurity in a water stream is oxidized to sulfate by molecular oxygen without employing a heavy metal sub-six sulfur oxidation catalyst. Such a catalyst, for example a copper salt, is, in general, at least as undesirable an environmental contaminant for a water stream as are the sub-six sulfur impurities herein.

2. Description of the Prior Art

A substantial effort has been directed to the improvement of water streams which contain inorganic sulfur-containing impurities in which the sulfur is in an oxidation state below +6. These impurities are a problem, because they impose an oxygen demand upon the aqueous environment. This demand may, and often is, preemptive relative to the oxygen need for one or more of the natural flora and fauna of the environment. Sulfur in a sub-six (below +6) oxidation state is especially undesirable in a waste water stream such as a sewage stream, and the like. Such streams must be treated with chlorine in order to eliminate harmful bacteria and the like which are present in the sewage. Inorganic sub-six-sulfur-containing impurities, however, interact preferentially with chlorine. Hence, the amount of chlorine required for a satisfactory sterilization of sewage is greatly increased when the sewage contains sulfur and/or sub-six-sulfur-containing compounds. These and other problems caused by inorganic sub-six-sulfur-containing compounds are treated in the reference book *Aqueous Waters from Petroleum and Petrochemical Plants*, by Milton R. Beychok, John Wiley & Sons (1967). Minor amounts of fully oxidized sulfur —sulfate sulfur— on the other hand have not appeared to be deleterious to the environment and are often a natural product.

In the article "New Column Removes Sulfide with Air," *Hydrocarbon Processing and Petroleum Refiner*, May 1962, Vol. 41, pp. 149–153, J. D. Martin and L. D. Levanas, a mechanical unit is described for use in a method for the purification of sulfide-bearing process waters by air oxidation. An earlier article, "Ridding Process Waters and Caustic Solutions of Sulfides," *The Oil s Gas Journal*, Vol. 54 (1956), pp. 95–99, relates to technical details of an oxidative conversion of sulfide. The product is mainly thiosulfate. The same or a similar result is described in the case of the Martin-Levanas article. Thiosulfate is an impurity relative to the environment, and is also undesirable as a contaminant in a waste water stream, though less so than sulfide because of its lesser oxygen demand upon the environment. Two articles by Otto Abegg in the publication *Erdol und Kohle, Erdgas, Petrochemie:* (1) Vol. 14, No. 8, pp. 621–626 (1961); and (2) Vol. 15, No. 9, pp. 721–722 (1962), describe the results of a study having as its object a complete conversion of sulfide to sulfate. Abegg, however, reports only being able in the absence of a catalyst to obtain at best a product stream sulfate-to-thiosulfate distribution of 75:25%, respectively. Abegg discloses in the second paper a more complete conversion of thiosulfate to sulfate by using a heavy metal catalyst —a copper sulfide catalyst— but found that the copper catalyst was unsatisfactory because of corrosivity effects and of other problems. In terms of undesirable pollution effects, the impurities resulting from the use of a copper catalyst are probably more undesirable than the thiosulfate.

Canadian Patent No. 601,035 (7/5/60) relates to the oxidation of sulfidic-sulfur contents of waste water streams to thiosulfate.

SUMMARY OF THE INVENTION

The present invention is the method of improving a water stream, said stream containing an inorganic sub-six-sulfur-containing impurity, said impurity being at least one of the group consisting of elemental sulfur and inorganic compounds consisting of sub-six sulfur plus at least one element of the group consisting of oxygen, hydrogen, and carbon, and water-soluble salts of the acids included in said compounds, which comprises oxidizing said sub-six sulfur to sulfate by contacting said stream with molecular oxygen for a period in the range from about 0.1 to 5 hours and sufficient for at least a 90 percent conversion of said sub-six sulfur to sulfate, said oxidation being effected by carrying out the contacting in the presence of at least enough strong base to provide at least one equivalent of hydroxyl ion per gram atom of sub-six sulfur in said impurity, said contacting being effected in the substantial absence of heavy metal sub-six sulfur oxidation catalysts and said oxidation being effected by maintaining the stream in the liquid phase:

a. at a standard pH of at least about 9.6;
b. at a temperature in the range from about 90° to 180°C; and
c. at a partial pressure of molecular oxygen gas of at least about 0.5 atmosphere. Preferably the conversion to sulfate is at least 95 percent complete.

Surprisingly, the extent of the oxidation to sulfate of the sub-six sulfur in a dissolved inorganic sulfur-containing impurity in a water stream is critically dependent upon the pH of the water. Thus, if the pH is below about 9.6, the resulting oxidized sulfur-containing impurities are in large part in the form of thiosulfate. Thiosulfate, as discussed above, is undesirable because of its large oxygen demand and the increased chlorine requirement for sterilization of the water. If the pH is maintained above 9.6, the reduced-sulfur content of the water can be substantially completely converted to sulfate. Sulfate imposes no oxygen demand upon a water stream.

By a substantial absence of a heavy metal catalyst as used herein is meant by definition that for a given set of process conditions within the range herein, no heavy metal sub-six sulfur oxidation catalyst is added to the reaction medium and the amount of said heavy metal which may otherwise be present in the water stream, for example as a trace contaminant of the water stream, is a negligible amount, i.e., is no more than an amount sufficient to reduce the time for the 90 percent conversion to sulfate of the sub-six sulfur content of the stream by 1 percent relative to the corresponding time for the oxidation for a comparable stream free of the heavy metal catalyst.

BRIEF DESCRIPTION OF THE DRAWING

The drawing is a schematic flow diagram of a preferred embodiment of the invented process for treating a sulfidic- and caustic-containing water stream for the effective conversion of its sub-six sulfur content to sulfate.

DETAILED DESCRIPTION

Referring now in more detail to the embodiment of the invention shown in the drawing, a typical aqueous spent caustic (3 weight percent free NaOH) scrubbing stream, a refinery effluent stream, is introduced to the process via line 1. This stream is substantially free of hydrocarbons and has a highly obnoxious odor, is very toxic, and has a high biological oxygen demand as well as a high chemical oxygen demand. The principal sulfur-containing impurity in the stream is sulfide ion; there is some hydrosulfide ion. The counter-ions are mainly sodium, although ammonium and other alkali ions may also be present. Based upon the water, about 9000 ppm of sulfide-sulfur is present in the stream. The pH of the spent stream is above 13. The process loop comprises oxidizer 6, liquid-gas separator 10, indirect heat exchanger 2, and associated connecting piping, pumps, relief valves, and the like.

Via line 1 spent caustic feed is passed into heat exchanger 2, in which it is heated indirectly by the hot liquid effluent stream from separator 10. The heated fresh feed is withdrawn via line 3 from heat exchanger 2 and is passed into mixing zone 4, in which it is further heated by steam which is passed into the mixing zone via line 7. Sufficient steam is introduced into mixing zone 4 to adjust the temperature of the effluent stream from the mixing zone to about 135°C. This stream is passed via line 5 to oxidizer 6.

Oxidizer 6 is a multi-trayed bubble-cap tower capable of operation at a pressure of about 11 atmospheres and is fitted with a suitable gas dispersion unit. On the basis of a complete oxidation of the sulfide-sulfur values of the spent caustic stream to sulfate for a feed rate of 238.5 cubic meters per operating day, oxidizer 6 has a total volume of 34 cubic meters and a diameter of 1.8 meters. The process conditions in the oxidizer are:

| | |
|---|---|
| Liquid rate, liters/min. | 178 |
| Vapor velocity, m./sec. | 0.046 |
| Temperature, °C. | 135 |
| Pressure, Atms. | 11 |
| Residence time, hours | 2.5 |

The effluent liquid-gas mixture is withdrawn from oxidizer 6 via line 9 and is passed to separator (knockout drum) 10, in which the liquid portion of the process stream is separated from the vaporous portion of the stream. The separated gas is vented from unit 10 via line 11 for further processing, if desirable, for example to an incinerator (not shown). The separated and hot liquid portion of the process stream is withdrawn from separator 10 and is passed via line 12 to heat exchanger 2, and thence to discharge via line 13. The discharged aqueous stream contains little or no sub-six-sulfur-containing inorganic compounds and has little or no odor. Optionally, if the discharge stream is off-color, it may be passed through a bed of absorbent carbon. Since the sulfur content is essentially in the sulfate form, it exerts no oxygen demand upon the environment.

PROCESS FEED STREAMS

Water streams which contain sulfur and/or one or more inorganic sub-six-sulfur-containing compounds are improved by the present process and are contemplated for use as process feeds. Usually these streams will contain from 100 to 20,000 parts (weight) of sub-six sulfur (calculated as sulfur) per million parts of water. Water streams which contain as little as 50 ppm of sub-six sulfur are benefited by the process. At some point, of course, it becomes relatively uneconomical (possibly at a content of 25 ppm and less) to process a stream as herein. On the other hand, a somewhat larger amount of sub-six sulfur may be present in the stream. However, as the amount of sub-six sulfur present in the water increases, oxygen solubility decreases until eventually (say at greater than 30,000 ppm) the oxidation rate becomes impractically slow. In this case it is difficult to achieve an effective oxidation of the sub-six sulfur. Water streams having sub-six sulfur contents in the range from about 25 to 30,000 ppm (weight) are, in general, contemplated as feeds for the present process, preferably the streams contain an amount in the range from about 100 to 20,000 ppm.

The water streams suitable for use in the present process should not contain a substantial amount (i.e., in excess of 2 weight percent) of hydrocarbon(s), for the reason that an excessive amount of hydrocarbon impurity in the feed stream interferes with the aforementioned necessary mass transfer of molecular oxygen gas from the gas phase into the aqueous reaction medium. Sub-six-sulfur-containing refinery and the like waste water streams are preferably freed of their hydrocarbon content, for example by the use of settling tanks and the like, before being used as feeds for the instant process.

Representative water streams satisfactory for use as feeds to the present process include the so-called sour-water petroleum refinery effluents, sour condensates, spent caustic scrubbing solutions, partially cleaned-up pulp mill sulfite waters, spent polysulfide solutions, flue gas scrubbing solutions, ammonia- and hydrogen sulfide-stripped condensates, and the like petroleum refinery streams. Other suitable feeds include aqueous after-scrubs from chemical plants, effluent aqueous streams from metallurgical operations, and the like.

pH

The pH of the treated water stream has a profound effect upon the result obtained. In general, it has been found that the treated feed must have a standard pH which exceeds about 9.6 for there to be a practical rate of conversion of thiosulfate to sulfate. Thiosulfate appears, in general, to be an intermediate in the oxidation of lower sub-six sulfur moieties as herein to sulfate. The rate of oxidation of thiosulfate to sulfate becomes impracticably slow when the standard pH of the stream is below about 9.6. By a standard pH as used herein is meant by definition the pH of the stream as measured at 25°C and 1 atmosphere pressure.

The oxidation of thiosulfate in large part appears to go by a reaction which can be summarized as follows:

$$S_2O_3^= + 2O_2 + 2OH^- \rightarrow 2SO_4^= + H_2O$$

Hydroxyl ion is used up as the reaction proceeds, and the standard pH of the solution decreases as the thiosulfate is converted to sulfate. Therefore, in order to obtain a practical rate of reaction and a substantially complete conversion of the sub-six sulfur to sulfate, at least enough base (sodium hydroxide, potassium hydroxide, sodium carbonate, and the like inorganic strong bases) must be present in the stream to establish a standard pH of at least about 9.6 plus enough additional base to provide one equivalent of hydroxyl ion per gram atom of sub-six sulfur. That is, the standard pH of the stream must be maintained above about 9.6, preferably above 10, during the treatment.

TEMPERATURE

A useful oxidation rate is obtained in the present process at a suitable oxygen partial pressure at a temperature as low as 90°C. As the temperature is increased, the reaction constant increases and a more rapid conversion takes place. Only a limited range of increased temperature is effective for the process, however. While the rate constant increases with increased temperature, the solubility of molecular oxygen in the medium decreases. Therefore, the effective rate of the desired conversion peaks at an optimum temperature and falls off sharply. Satisfactory and useful conversions are in general obtained at process temperatures in the range from 90° to 180°C, and the preferred range is 120° to 165°C.

OXYGEN CONCENTRATION

Oxygen gas has only a limited solubility in water, especially in the reaction temperature range of the present process. However, the oxygen concentration in the water significantly influences the reaction rate. Therefore, as a practical matter, the concentration of molecular oxygen gas in the reaction medium must be maintained at a sufficient level, e.g., at a concentration which is at least 50% of the saturation value, preferably 80%. To this end, and for a given pressure, there must be an effective contacting of the molecular oxygen-containing gas stream with the aqueous stream being treated by the present process. Effective contacting means include the use of gas dispersion manifolds, of conventional vigorous mixing techniques, of countercurrent streams, and particularly of multi-trayed bubble-cap towers, and the like.

PRESSURE

The partial pressure of oxygen gas for a useful conversion as herein should be at least 0.5 atmosphere. In the case where air is the oxygen-containing gas, the total pressure will be at least about 2.5 atmospheres. For a given temperature, the higher the oxygen-gas partial pressure the higher is the concentration of oxygen gas in the aqueous reaction medium. As a practical matter, and in view of compressor costs, the use of a system pressure above 20 atmospheres is usually not desirable. The use of oxygen gas partial pressures in the range from 1 to 5 atmospheres is preferred.

The oxidation reaction herein is a liquid-phase reaction. Therefore, the system pressure must be at least sufficient to maintain water in the liquid phase.

TIME

The time (residence time in the reaction zone) required for a satisfactory conversion varies, depending in the main upon: (1) the concentration of the sulfur-containing impurity in the water stream; (2) the temperature employed; and (3) the partial pressure of molecular oxygen in the reaction zone. In general, satisfactory residence times are in the range from about 0.5 to 5 hours. The shorter times relate to the use of feed streams having a moderate-to-low concentration of the sulfur-containing impurity(s), to the use of a substantial oxygen-gas partial pressure, i.e., the use of air and a system pressure above about 10 atmospheres, and to the use of a process temperature in the range 120° to 180°C, preferably about 135°C. The longer residence times correspond to the use of the relatively less favorable, yet nonetheless useful, process conditions within the broad ranges described above.

SUB-SIX SULFUR IMPURITIES

The impurities which may be effectively oxidized to sulfate by the process herein include elemental sulfur, hydrogen sulfide, water soluble salts of hydrogen sulfide, polysulfide salts, sulfur dioxide, carbonyl sulfide (COS), carbon disulfide, thiosulfate salts and the like inorganic sub-six(below plus 6.)-sulfur-containing compounds, that is at least one impurity selected from the group consisting of elemental sulfur, inorganic compounds consisting of sub-six sulfur plus at least one element selected from the group consisting of oxygen, hydrogen, and carbon, and water soluble salts of the acids included in the group of compounds. For these salts the cations will be one or more ions of the group consisting of ammonium and the like nitrogenous ions, and ions of Group I and II metals of the Periodic Chart of the Elements, such as sodium, potassium, magnesium, calcium and the like.

SOUR-WATER TREATMENT

The following examples were carried out in a stirred autoclave reactor which was fitted for control of the system temperature and pressure. Compressed air was introduced into the autoclave at a basal portion and vented from a void (liquid-free) section of the reactor. A series of preliminary tests was run to determine the air and stirring rates necessary to insure that mass transfer of molecular oxygen into the reaction medium was not a limiting factor. Except as indicated, the tests reported below were carried out under conditions where mass transfer was not a limitation. In the present equipment, oxygen mass-transfer effects were avoided by using a stirring rate of about 4500 rpm and an air rate of 0.42 standard cubic meters per hour.

The feed used in the examples (TABLE I) was waste water (sour water) from three different petroleum refineries, having the characteristics:

|  | Feed | | |
| --- | --- | --- | --- |
|  | A | B | C |
| pH (22°C) | 12.5 | 12.5 | 12.4 |
| HS⁻, ppm | 3,780 | 2,350 | 6,250 |
| Total dissolved solids, ppm | 20,600 | 10,700 | 45,700 |

TABLE I

| Ex. No. | Feed | Experimental Conditions | | | Product pH[1] | $S_2O_3^=$ Yield, % Observed[2] | $-SO_4^=$ Yield, % Observed[2] |
|---|---|---|---|---|---|---|---|
| | | Temp., °C. | Pressure, psig | Time, Hours | | | |
| 1 | A | 149 | 148 | 1.0 | | 5 | 94 |
| 2 | A | 149 | 148 | 1.0 | 10.1 | 18 | 86 |
| 3 | A | 149 | 148 | 0.5 | 10.1 | 7 | 94 |
| 4 | A | 149 | 148 | 0.5 | 9.9 | 22 | 83 |
| 5 | A | 149 | 100 | 2.0 | 9.7 | 0 | 100 |
| 6 | A | 149 | 100 | 2.0 | 9.7 | 0 | 98 |
| 7 | A | 149 | 100 | 1.5 | 9.7 | 5 | 98 |
| 8 | A | 149 | 100 | 1.0 | 10.2 | 30 | 74 |
| 9 | A | 149 | 100 | 0.5 | 10.5 | 48 | 58 |
| 10 | A | 135 | 150 | 0.75 | | 7 | 93 |
| 11 | A | 121 | 87 | 1.5 | | 26 | 78 |
| 12 | A | 121 | 87 | 0.5 | | 55 | 53 |
| 13 | A | 93 | 92 | 2.5 | 9.6 | 33 | 68 |
| 14 | A | 93 | 92 | 2.0 | 9.6 | 31 | 69 |
| 15 | A | 93 | 92 | 1.0 | 10.1 | 51 | 44 |
| 16 | A | 93 | 92 | 0.5 | 10.9 | 63 | 34 |
| 17 | A | 93 | 45 | 3.0 | 9.7 | 65 | 39 |
| 18 | A | 93 | 45 | 2.0 | 9.6 | 64 | 49 |
| 19 | A | 93 | 45 | 1.33 | | 68 | 50 |
| 20 | A | 93 | 45 | 1.0 | 11.2 | 69 | 28 |
| 21 | A | 93 | 45 | 0.5 | 12.1 | 81 | 20 |
| 22 | B | 162 | 150 | 2.0 | | 0 | 100 |
| 23 | B | 149 | 100 | 1.0 | | 32 | 93 |
| 24 | B | 93 | 92 | 1.0 | | 39 | 64 |
| 25 | C | 162 | 150 | 2.0 | | 3 | 100 |
| 26 | C | 162 | 150 | 1.5 | 12.0 | 3 | 100 |
| 27 | C | 162 | 150 | 1.0 | | 19 | 79 |
| 28 | C | 149 | 150 | 1.0 | 12.2 | 29 | 70 |
| 29 | C | 135 | 150 | 2.0 | | 2 | 98 |
| 30 | C | 135 | 150 | 1.5 | | 27 | 60 |
| 31 | C | 135 | 150 | 1.0 | | 44 | 49 |
| 32 | C | 135 | 125 | 2.0 | | 3 | 96 |
| 33 | C | 135 | 100 | 2.0 | | 33 | 67 |
| 34 | C | 135 | 75 | 2.0 | | 47 | 46 |
| 35 | C | 129 | 150 | 1.0 | 12.2 | 48 | 47 |
| 36 | C | 107 | 150 | 3.0 | | 3 | 97 |
| 37 | C | 107 | 150 | 2.0 | 12.0 | 5 | 96 |

[1]pH measured at 22°C.
[2]Yields calculated on basis of conventional sulfur analyses. Due to analytical errors, thiosulfate and sulfate yields do not necessarily total 100%.

The foregoing examples demonstrate that sub-six sulfur-containing impurities are efficiently converted to relatively innocuous sulfate by the process of the present invention. Conventional functional effects for the variables, time and temperature, in a chemical reaction are also demonstrated, i.e.: (1) the reaction rate increases with increasing temperature; and (2) the reaction goes essentially to completion given sufficient time (the reaction is not equilibrium-limited).

Similar results obtained when the inorganic sulfur-containing impurity is one or more of the following: water-soluble disulfide, polysulfide, sulfite, pyrosulfite, a polythionate (i.e., di-, tri-, tetra- and pentathionate), thiosulfate salts (i.e., water-soluble salts containing sub-six sulfur), and the like.

pH AND OXYGEN PARTIAL PRESSURE

The effects of pH and oxygen partial pressure were demonstrated using a refinery waste-water feed and the reactor as in the previous examples. The runs were made at 93°C under comparable conditions, except that the oxygen partial pressure was 10 psi and 20 psi. In each case the initial pH of the medium was above 10, and there was insufficient base in the reaction medium to maintain the pH above 9.6. The conversion of the sulfidic-sulfur to sulfate ceased in each case when the pH had dropped to 9.6. The degree of conversion to sulfate was as follows:

| Ex. No. | O$_2$ Partial Pressure, psi | Conversion, % |
|---|---|---|
| 38 | 10 | 36 |

-continued

| Ex. No. | O$_2$ Partial Pressure, psi | Conversion, % |
|---|---|---|
| 39 | 20 | 68 |

Examples 38 and 39 and the examples above illustrate that when the pH is maintained above 9.6 and there is sufficient time for completion of the reaction (compare Examples 5-8, 26 and 27 above), essentially complete conversions of sub-six-sulfur-containing impurities is effected in the present invention.

The examples in this case also demonstrate that the oxygen partial pressure in the reaction system exerts a significant effect upon the oxidation of sub-six-sulfur-containing impurities in the reaction system of the present invention.

AQUEOUS SPENT CAUSTIC SOLUTION TREATMENT

Aqueous caustic scrubbing solutions are frequently used in the art, particularly in petroleum refinery technology, to remove acidic components from liquid and gaseous process streams. In this use, the caustic (usually sodium hydroxide or the like) is neutralized by the acids and ultimately a so-called spent caustic solution remains for disposal. Usually the principal acidic components comprise sub-six-sulfur-containing acids, such as hydrogen sulfide and sulfurous acid. As in the case of the sour-water streams, it is desirable that the sulfur impurities (salts of the aforementioned acids) be oxidized to the sulfate-sulfur form. Spent caustic scrubbing solutions are distinguishable in the main over sour-water streams in that they contain relatively large amounts of unneutralized caustic and sulfide ions, $S^=$ and relatively little $HS^-$ ion. Because the presence of substantial concentrations of sulfide, $S^=$, ion interferes with the $H_2S$ adsorption capacity of a caustic scrubbing solution, the addition of fresh caustic to the spent solution is not a particularly effective means for regeneration. However, if the sulfide ion can be removed from the solution, for example by conversion to sulfate, the useful life of the scrubbing solution can be extended advantageously, i.e., by a substantial reduction in the process water requirement, and the like.

The following examples were carried out in the equipment and manner described for the examples above. The process parameters and the ranges researched were:

| | |
|---|---|
| Reaction time, hours | 0.5 to 2 |
| Temperature, °C | 93 to 150 |
| Oxygen partial pressure, psi | 15 to 30 |
| Sulfide ion ($S^=$) concentration, ppm | 7600 to 9300 |
| Total caustic, Wt. % as NaOH | 3 to 8 |
| Free caustic, Wt. % as NaOH | 2 to 8 |
| Total dissolved solids, Wt.% | 8 to 11 |

In the following examples, spent caustic from two different petroleum refineries were used. The feed characteristics were:

| | D | E |
|---|---|---|
| Sulfide ($S^=$) ion in concentration, ppm | 9,300 | 7,600 |
| Total dissolved solids, ppm | 80,000 | 114,000 |
| Free caustic[1] wt.% | 2.4 | 7.6 |
| Total caustic[1,2], wt.% | 5.8 | 8.3 |

[1]Weight percent as NaOH
[2]Corrected for presence of sulfide, $S^=$ in these runs even for short residence times at the least severe reaction conditions. These examples further illustrate that the presence of excess caustic in the reaction medium benefits the reaction at moderate levels of concentration, i.e., of the order of 1 weight percent free caustic in the solution, and at higher levels does not adversely affect the desired reaction.

In the above examples, the color of the product solution varied, depending upon the feed stream employed. Thus, for stream D, the initial color of the feed was very dark. When only a partial oxidation had been achieved, it was colorless and clear, and remained so to the completion.

In the case of stream E, however, the original color of the feed was a deep orange-brown, and no improvement resulted from the oxidation. However, when the E feed was treated with activated carbon and when the oxidized feed was so treated, in both cases the effluent was colorless.

It is apparent that many widely differing embodiments of the present invention may be made without departing from the scope and spirit thereof. Therefore, the invention is not intended to be limited except as indicated in the appended claims.

I claim:

1. In the method of improving a water stream containing inorganic sub-six-sulfur-containing impurities by oxidizing said sulfur to sulfate using a gas comprising molecular oxygen, the improvement which comprises using as feed a stream containing said impurity in an amount, calculated as sulfur and per million parts (weight) of water, in the range from about 100 to 20,000 parts (weight), and said impurity being at least one of the group consisting of elemental sulfur and inorganic compounds consisting of sub-six sulfur plus

TABLE II

| Ex. No. | Feed | Experimental Conditions Temp., °C. | Pressure, psig | Time, Hours | Free[1] | Total[1,2] | $S_2O_3^=$ Yield, %[3] | $SO_4^=$ Yield, %[3] |
|---|---|---|---|---|---|---|---|---|
| 40 | D | 93 | 68 | 0.5 | | | 97 | 5 |
| 41 | D | 93 | 68 | 1.0 | 2.7 | 4.6 | 89 | 16 |
| 42 | D | 93 | 68 | 1.0 | 2.6 | 4.8 | 86 | 15 |
| 43 | D | 93 | 68 | 2.0 | 2.1 | 4.1 | 19 | 85 |
| 44 | D | 93 | 116 | 0.5 | 2.4 | 4.2 | 71 | 25 |
| 45 | D | 93 | 116 | 1.0 | 1.6 | 3.4 | 9 | 81 |
| 46 | D | 93 | 116 | 2.0 | 1.9 | 3.9 | 0 | 98 |
| 47 | D | 121 | 111 | 0.5 | 2.2 | 4.1 | 69 | 41 |
| 48 | D | 121 | 111 | 1.0 | 1.7 | 3.6 | 14 | 85 |
| 49 | D | 149 | 124 | 0.5 | 1.9 | 3.8 | 24 | 74 |
| 50 | D | 149 | 124 | 1.0 | 1.8 | 3.8 | 0 | 99 |
| 51 | E | 93 | 92 | 1.0 | 7.7 | 8.0 | 74 | 26[4] |
| 52 | E | 93 | 92 | 2.0 | 7.2 | 7.7 | 22 | 78[4] |
| 53 | E | 93 | 140 | 0.5 | 7.4 | 7.9 | 74 | 26[4] |
| 54 | E | 93 | 140 | 1.0 | 7.2 | 7.6 | 43 | 57[4] |
| 55 | E | 93 | 140 | 2.0 | 7.5 | 7.6 | 0 | 100[4] |
| 56 | E | 149 | 148 | 0.5 | 7.2 | 7.7 | 30 | 70[4] |
| 57 | E | 149 | 148 | 1.0 | 7.5 | 7.9 | 0 | 100[4] |

[1]Weight percent as NaOH. Measured at 21°C.
[2]Corrected for presence of sulfide, $S^=$.
[3]Observed yields calculated on basis of product total sulfur analysis. Due to analytical errors, thiosulfate and sulfate yields do not necessarily total 100%.
[4]Obtained by difference between total sulfur and thiosulfate.

Examples 40–57 illustrate that sub-six-sulfur-containing impurities in a spent caustic scrubbing solution are efficiently converted to sulfate. The use of a reaction temperature above 93°C and of an oxygen partial pressure above 20 psi is especially desirable, in that reaction times of less than about 2 hours, particularly in the range 0.1 to 1 hour, may be employed and yet have the desired high degree of conversion. Surprisingly, sulfide, $S^=$, could not be found in the reaction products at least one element of the group consisting of oxygen, hydrogen, and carbon, and water-soluble salts of acids included in said compounds, and oxidizing said sub-six sulfur to sulfate by contacting said stream with molecular oxygen for a period in the range from about 0.1 to 5 hours and sufficient for at least a 90 percent conversion of said sub-six sulfur to sulfate, said oxidation being effected by carrying out the contacting in the presence of at least enough strong base to provide at least one equivalent of hydroxyl ion per gram atom of sub-six sulfur in said impurity, said contacting being effected in the substantial absence of heavy metal sub-six sulfur oxidation catalysts and said oxidation being effected by maintaining the stream in the liquid phase:
  a. at a standard pH of at least about 9.6;
  b. at a temperature in the range of from about 90° to 180°C; and
  c. at a partial pressure of molecular oxygen gas of at least about 0.5 atmosphere.

2. The method as in claim 1 wherein the conversion of the sub-six sulfur impurity content to sulfate is substantially complete.

3. A method as in claim 1 further characterized in that said impurity comprises thiosulfate.

4. The process as in claim 1 wherein said liquid phase has an oxygen gas concentration which is at least 80% of the saturation value.

5. The method as in claim 1 wherein said stream is a refinery stream.

6. A method as in claim 1 further characterized in that said impurity comprises sulfide.

7. The process as in claim 1 wherein said liquid phase has an oxygen gas concentration which is at least 50% of the saturation value.

8. A method as in claim 7 further characterized in that said oxygen gas concentration is at least 80% of the saturation value.

9. A method as in claim 1 further characterized in that said liquid phase is maintained at a temperature in the range of 120° to 165°C.

10. A method as in claim 1 further characterized in that said liquid phase temperature is about 135°C.

* * * * *